Aug. 22, 1967  W. L. BINGHAM ETAL  3,336,834
METHOD FOR DETERMINING DIRECTION AND MAGNITUDE OF RESIDUAL
STRESSES IN STRUCTURES
Filed Dec. 13, 1963
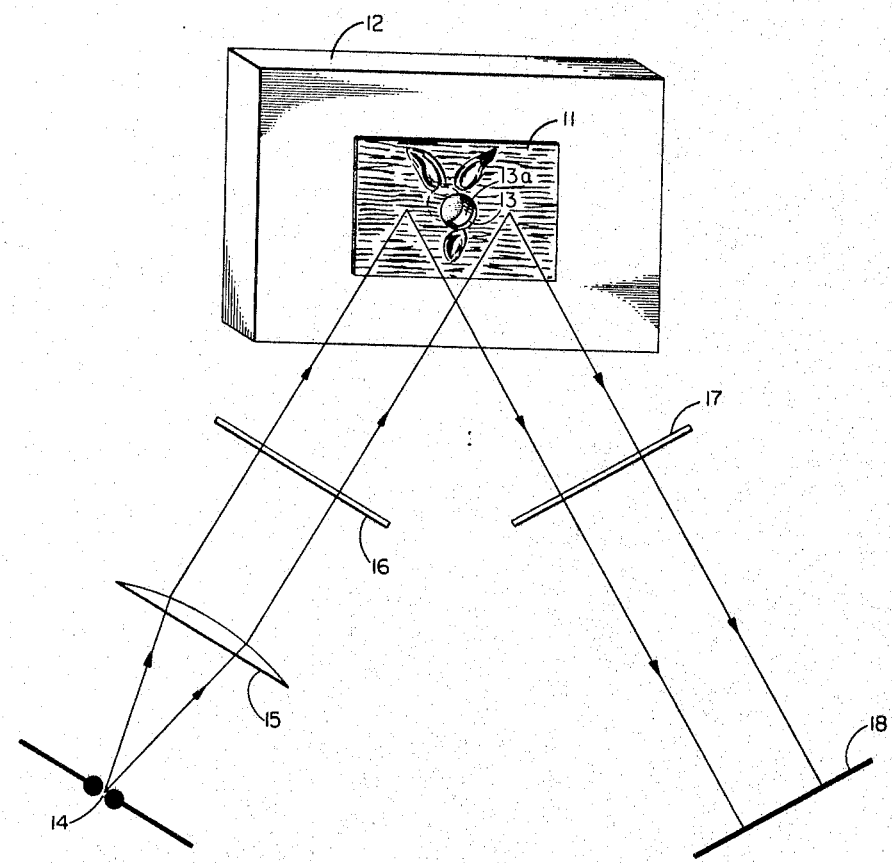
INVENTORS
WILLIAM L. BINGHAM
ERWIN W. KAMMER
BY *Melvin L. Crane* AGENT
*Richard C. Reed* ATTORNEY 3,336,834
METHOD FOR DETERMINING DIRECTION AND MAGNITUDE OF RESIDUAL STRESSES IN STRUCTURES
William L. Bingham, Riverdale, Md., and Erwin W. Kammer, McLean, Va., assignors to the United States of America as represented by the Secretary of the Navy
Filed Dec. 13, 1963, Ser. No. 330,208
2 Claims. (Cl. 88—14)

ABSTRACT OF THE DISCLOSURE

This invention is directed to a method of measuring the residual stress in a piece of material. The method is carried out by securing a piece of photoelastic material to the surface to be tested and then boring a small hole through the photoelastic material and into the surface upon which the photoelastic material is secured. An isochromatic fringe pattern results when viewed through a light polarizer and analyzer of the light passing through the photoelastic material reflected from the surface. From this pattern one can determine the magnitude and, upon application of heat to the photoelastic material, the direction of the residual stress of the structure.

---

The invention described herein may be manufactured and used by or for the Government of the United States of America for governmental purposes without the payment of any royalties thereon or therefor.

The present invention relates to methods of determing stress or strain in rigid bodies and more particularly to a method of detecting and measuring the presence, direction and magnitude of locked-in stress of structures such as welded joints, beams, girders and other structures from both tensile and compressive stress.

Heretofore various methods such as photoelastic coatings, the use of strain gages, static tests, models, X-ray diffraction measurements, and many others have been used for strain determinations. All of these methods have their drawbacks and disadvantages for determining stress loadings on assembled structures which are in use or have been used.

It is therefore an object of the present invention to provide a method of determining locked-in stress of an element under load conditions.

Another object is to provide a simple method for determining locked-in stress which can be determined by unskilled as well as skilled personnel.

Still another object is to provide a method of testing an object under actual operating conditions.

Yet another object is to provide a method of determining locked-in stress of an object in "the field" as well as at local stations.

Other objects and advantages of the present invention will become apparent to others from the following disclosure and description of the drawing, wherein:

The drawing illustrates a photoelastic resin sheet mounted onto a structure and a light-optical system for carrying out the present invention.

In carrying out the method of the present invention to determine the presence of and to a measure direction and magnitude of locked-in stress particularly in large structures, the surface is cleaned for securing, by bonding, a sheet of optically active resin thereto. The sheet of resin is secured thereto then a small hole is drilled through the resin sheet and into the surface of the structure for a short distance. The small hole releases the surface stress by permitting the contour of the hole to distort. Since the resin is bonded to the surface, the resin deforms in conformity to the relaxation occurring around the hole in the surface of the structure. A polarized light and analyzer is then used to determine the stress patterns set-up in the sheet of resin due to the stress in the structure about the hole drilled in the surface.

Now referring to the drawing, there is shown by illustration a system for determining non-torsional stress in a structure. As shown a sheet of optically active resin 11 is cemented to the structure 12. A hole 13 is drilled through the resin and into the structure for a short distance to form a hole 13a in the structure. As the hole 13a is drilled into the surface the resin will be stressed by the residual stress in the structure. For illustrative purposes such a stress pattern is shown on the drawing in the form of three separate tear shaped areas surrounding the hole. A light beam from a light source 14 is directed through a collimating lens 15, through a polarizer 16, and through the sheet of resin, onto the surface of the structure at an angle thereto. The surface reflects the light back through the resin sheet, through an analyzer 17, and onto a film 18 or any other means for observing or recording the image or characteristics of the stress pattern that appears in the resin sheet. The surface of the structure to which the resin sheet is bonded must be reflective in order to reflect the light back through the resin sheet.

If the surface of the structure is not of a material which can be cleaned and made reflective, then the surface of the resin sheet which is bonded to the structure is silvered or coated with a reflective coating which reflects the light back through the resin sheet. Of course, the reflective coating could also be applied to the surface of the structure prior to bonding the sheet of resin.

By use of a low modulus flexible photoelastic material, which has the flexibility of conforming to a curved or irregular surface, or by polymerizing the plastic directly on the surface, irregular or curved surface structures can be tested by the above method.

The method of the present invention is essentially an omnidirectional strain gage. This method places no restriction of registry, needs only a source of light, polarizing analyzers, and for a permanent record, a camera.

It remains then after establishing the direction of principal interest stress pattern and estimating its magnitude to determine if the surface of the structure is in tension or compression. This is arrived at by taking advantage of the large difference in temperature coefficient of linear expansion between most structural metal and the photoelastic resin. In a typical case, steel has an expansion coefficient of about 6 p.p.m./° F. while a typical resin such as the Ciba resin 502 with 951 hardener has an expansion coefficient of about 40 p.p.m/° F. Hence, if after the hole is drilled and the stress pattern recorded, the resin film and metal surface is warmed with an infrared lamp, the resin expands more than the steel base. Suppose that the internal stress is tension. Then expansion of the resin relative to the steel will cancel or relative to the steel will cancel or relieve some of the induced distortion resulting from the drilled hole because the resin is being slightly compressed. In other words the photoelectric pattern will exhibit characteristics of a lower stress calibration as the surface is heated which indicates that the structure is under tension. Correspondingly, if the structure surface had been in compression the change in characteristic photo stress pattern would move towards higher stress calibrations if the surface is heated. The change in temperature necessary to do this is only a matter of 20 or 30 degrees Fahrenheit.

Another technique for determining whether the largest principal stress is tensile or compressive is as follows. Before securing the sheet of resin to the structure, the resin sheet is stressed in either uniform tension or compression in all directions. (This might be done for example by uniformly shrink-fitting a ring around a sheet of resin. Many other schemes of placing the resin in uniform tension or compression exist of course.) Securing the resin sheet to the surface of the structure and subsequently drilling a hole through the resin and into the structure. After drilling the hole through the resin and into structure the resultant fringe pattern will be due to the initial stress in the resin and in the stress structure. But the uniform, omnidirectional (isotropic) stress state in the resin produces only a system of concentric circular isochromatic fringes around the hole. The elongation or deformation of the resin by the stresses released where the hole is drilled into the structure modifies this concentric circular fringe pattern. This modified pattern is then directly interpretable into direction magnitude and sign (tensile or compressive) of the larger principle stress. Suppose that the resin is initially in isotropic compression and the larger principal stress in the structure is tension. Two zero order fringe spots will appear on a line perpendicular to the direction of the larger principal stress to determine that the structure was in tension. If the direction of the largest principal stress is colinear with a line passing through the two spots then the structure is known to have been in compression.

Thus the methods set forth above permits one to determine built-up or residual stress in a structure, the direction, magnitudes, and whether the structure is under compression or tension. These methods are simple and can be carried out by unskilled personnel as well as skilled personnel without unduly affecting the structure during the test. Also the test is carried out wherever the structure is located in its own environment without any other equipment except the equipment needed to observe the stress patterns.

Obviously many modifications and variaitons of the present invention are possible in the light of the above teachings. It is therefore to be understood that within the scope of the appended claims the invention may be practiced otherwise than as specifically described.

What is claimed is:

1. A method of detecting the presence, direction, magnitude and type of locked-in stress in a structure which comprises;
    (a) cleaning a surface of said structure to bond a sheet of resin thereto,
    (b) bonding said sheet of resin onto said cleaned surface,
    (c) drilling a hole through said sheet of resin bonded onto said surface and into said structure a short distance,
    (d) directing a beam of parallel light through a polarizer and through said sheet of resin at an angle thereto in the vicinity of said hole drilled into the structure through said sheet of resin,
    (e) passing light reflecetd back through said sheet of resin through an analyzer,
    (f) and detecting the light after passing through said analyzer to indicate stress patterns set-up within said sheet of resin,
    (g) heating said sheet of resin and said structure with a heat source thereby expanding said sheet of resin relative to said structure,
    (h) and observing the stress pattern in said sheet of resin whereby less stress lines appearing in said sheet of resin indicates tension in said structure and more stress lines appearing in said sheet of resin indicates that the structure is in compression.

2. A method of detecting the presence, direction and magnitude of locked-in stress in a structure which comprises;
    (a) cleaning a surface of said structure to bond a sheet of resin thereto with a reflective surface on one surface of said sheet of resin,
    (b) bonding said sheet of resin onto said cleaned surface with the reflective surface juxtaposed said cleaned surface,
    (c) drilling a hole through said sheet of resin bonded onto said surface and into said structure a short distance,
    (d) directing a beam of parallel light through a polarizer and through said sheet of resin at an angle thereto in the vicinity of said hole drilled into the structure through said sheet of resin,
    (e) passing light reflected back through said sheet of resin through an analyzer,
    (f) and detecting the light after passing through said analyzer to indicate stress patterns set-up within said sheet of resin,
    (g) heating said sheet of resin and said structure with a heat source thereby expanding said sheet of resin relative to said structure,
    (h) and observing the stress pattern in said sheet of resin whereby less stress lines appearing in said sheet of resin indicates tension in said structure and more stress lines appearing in said sheet of resin indicates that the structure is in compression.

References Cited

UNITED STATES PATENTS

| | | | |
|---|---|---|---|
| 3,125,615 | 3/1964 | Redner | 88—14 X |
| 3,178,934 | 4/1965 | O'Regan | 88—14 X |
| 3,256,768 | 6/1966 | Nisida | 88—14 |

JEWELL H. PEDERSEN, *Primary Examiner.*

A. A. KASHINSKI, *Assistant Examiner.*